United States Patent
Qu et al.

(10) Patent No.: US 6,895,997 B2
(45) Date of Patent: May 24, 2005

(54) SYSTEM FOR DETERMINING POSITIONS OF A CONTROL ELEMENT OF AN ELECTRICALLY DRIVEN ACTUATOR

(75) Inventors: Wenmin Qu, St. Ingbert (DE); Horst Peter Mannebach, Munstermaifeld (DE); Joachim Morsch, Marpingen (DE)

(73) Assignee: Hydac Electronic GmbH, Saarbrücken (DE)

( * ) Notice: Subject to any disclaimer, the term of this patent is extended or adjusted under 35 U.S.C. 154(b) by 287 days.

(21) Appl. No.: 10/367,680

(22) Filed: Feb. 19, 2003

(65) Prior Publication Data

US 2004/0016461 A1 Jan. 29, 2004

(30) Foreign Application Priority Data

Jul. 26, 2002 (DE) .......................... 102 35 188

(51) Int. Cl.$^7$ ............................ F16K 37/00; G01B 7/14
(52) U.S. Cl. ............. 137/554; 324/207.11; 324/204.24; 361/160
(58) Field of Search ...................... 137/554; 324/204.11, 324/207.24; 361/154, 160

(56) References Cited

U.S. PATENT DOCUMENTS

| | | |
|---|---|---|
| 4,970,622 A | 11/1990 | Büchl |
| 5,481,187 A | 1/1996 | Marcott et al. |
| 5,578,904 A | 11/1996 | Marcott et al. |
| 5,600,237 A | 2/1997 | Nippert |
| 5,835,330 A * | 11/1998 | Kirschner et al. .......... 361/154 |
| 6,111,741 A * | 8/2000 | Schmitz et al. ............ 361/154 |
| 6,158,715 A * | 12/2000 | Kirschbaum ................ 361/160 |
| 6,648,297 B1 * | 11/2003 | Butzmann et al. .......... 361/160 |

FOREIGN PATENT DOCUMENTS

| | | |
|---|---|---|
| DE | 33 26 605 A1 | 2/1985 |
| DE | 4341797 | 6/1995 |
| DE | 4420282 | 12/1995 |
| DE | 101 36 672 A1 | 3/2002 |

* cited by examiner

*Primary Examiner*—John Rivell
(74) *Attorney, Agent, or Firm*—Roylance, Abrams, Berdo & Goodman, L.L.P.

(57) ABSTRACT

System determines the position of a control element of an electrically driven actuator. The actuator may be switched on by a controlled switch when a lower threshold value is reached and may be switched off when an upper threshold value is reached. An on-period and an off-period are determined as a function of the lower threshold value, the upper threshold value, and the electric switching behavior of the actuator depending on the position of the control element. From the on-period and the off-period, the position of the control element are determined from a comparison of the quotient of the on-period or off-period and the sum of the on-period and off-period, and from a comparison of the sum of the on-period and the off-period with corresponding stored reference data. The system includes accompanying circuitry for application of the process, and an accompanying device, in particular a hydraulic valve.

13 Claims, 3 Drawing Sheets

SYSTEM FOR DETERMINING POSITIONS OF A CONTROL ELEMENT OF AN ELECTRICALLY DRIVEN ACTUATOR

FILED OF THE INVENTION

The present invention relates to a process for determining the position of a control element of an electrically drivable actuator, particularly a hydraulic valve as well as the circuitry and device therefor.

BACKGROUND OF THE INVENTION

Typical areas of application of drivable or driven actuator positioning determining processes are employed, for example, by electromagnetically operated valves or switches. The inductance of the electromagnet depends on the particular position of the armature. Consequently, measurement of the inductance in essence permits determination of the position of the armature.

DE 33 26 605 A1 discloses a process and circuitry for monitoring the lifted position of the armature of a valve magnet. The winding is supplied with direct current having an alternating current-component. The alternating component depends on the position of the armature, and accordingly, the valve position, and is measured at a precision resistor by means of a high-pass filter.

The conventional process is disadvantageous in that the switching frequency being set also depends on the active resistance of the coil. The active resistance in turn depends to a relatively great extent on the temperature, which can create a disturbance variable in the output signal relating to the position of the armature. This disruptive effect is to be offset by circuit engineering measures on the basis of the direct-current component, as measured.

SUMMARY OF THE INVENTION

Objects of the present invention are to provide a process, accompanying circuitry and a device which overcome the disadvantages of conventional systems by determining the position of the control element with high accuracy and especially with adequate compensation made for the influence of temperature.

Other objects of the present invention are to provide such process and accordingly the pertinent circuitry and device which are cost effective in manufacture and maintenance, and in addition guarantee reliable long-term operation.

The process determines the position x of a control element of an electrically drivable or driven actuator engaged by a controlled switch when a lower threshold value is reached and disengaged when an upper threshold value is reached. A duration of engagement $t_{on}$ and duration of disengagement $t_{off}$ are determined as a function of the lower threshold value, the upper threshold value, and the electric switching behavior of the actuator depending on the position x of the control element. The position x of the control element is determined from a comparison of the quotient of duration of engagement $t_{on}$ or duration of disengagement $t_{off}$ and the sum $t_{on}+t_{off}$ and from a comparison of the sum $t_{on}+t_{off}$ of duration of engagement $t_{on}$ and duration of disengagement $t_{off}$ with particular stored reference data.

The electrically drivable actuator can be an electromagnetically drivable actuator, a piezoelectrically drivable actuator, or any other type of actuator performing a mechanical movement on the basis of an electric control signal and as a result acts as an actuator element or switching element in a closed loop. In a specific embodiment of the present invention, the actuator element is represented by the armature of an electromagnet. The movement of the armature can be translational and/or rotatory. In the case of translational movement, the control path of the control element may range from fractions of a millimeter to several centimeters.

In principle, the quotient of period of engagement (on-period) or duration of disengagement (off-period) and the sum of engagement and disengagement periods may also be determined by means of an analog computer. However, for reasons of immunity to interference, for example, or for considerations of cost, a digital electronic computer is preferred. The on and off periods may be determined, for example, by counting the pulses of an appropriate high-frequency and optionally central cycle, the on and/or off signal serving as switching signals for the high-frequency cycle. Comparison with the stored reference data, which are customarily obtained by empirical means, as for example on the basis of an actuator typical for the design in question, is also made preferably by the electronic computer unit.

The quotient of on-period and/or off-period and the sum of on-period and off-period may be designated as pulse-width ratio or pulse-width repetition rate. Such rate depends both on the position x of the control element of the actuator and, generally, also on the temperature of the system. Typical temperature values during operation of the corresponding devices range from 50 to 100° C., and may also be above or below these temperatures, depending on the ambient temperatures.

Comparison of a quotient as determined with the stored reference data still, generally speaking, does not guarantee adequate accuracy as regards determination of position x of the control element. The temperature value contained in this quotient could be calculated, for example, by way of a temperature sensor mounted near the system. Preferably, of course, compensation for the influence of temperature is effected by comparison of the sum of the on-period and off-period with corresponding reference data.

For example, the stored pairs of reference data "position x" and "temperature T," which enter into account on the basis of the quotient as determined, are used to determine as valid, on the basis of the sum of on-period and off-period also determined, the pair of values for which corresponding reference data relating to the total signal determined are stored. If necessary, interpolation may also be effected in this instance to calculate an intermediate value between the two values as determined or the two values as stored.

As an alternative or in addition a comparison may be made to store parameterized equations representative of the specific design of the actuator. In the equations, the quotients and sums, as measured, are introduced as variables. It is essential that both the quotient and the sum be employed for determination of the position of the control element.

In a particular embodiment of the present invention, the control element operates a valve, for example, a hydraulic or pneumatic valve. The valve in question may be an on-off valve or a proportional valve, such as a control valve for continuous adjustment of a preset flow or pressure.

The switch controlled may be represented by a contact-free electronically controlled switch such as a transistor, a MOS transistor in particular. In addition to first and second switching electrodes, such switches customarily have a third control connection. By the third connector, high switching output can also be achieved by means of low control output, with zero wear and with low power loss.

In the case of an electromagnet, the coil current of the winding of the electromagnet is controlled. Upper and lower threshold values may be preset for this coil current. The values, in particular, may be adjustable and/or controlled by a stored program. Selection of this operating point and the difference in threshold values determine the oscillating switching behavior established. To monitor reaching of the threshold values, a voltage signal is evaluated at a resistor by way of which the coil current flows. The active resistance of the coil winding could also be considered for this purpose. By preference, of course, use is made of an active resistance connected in series with the actuator. Especially with the coil winding, an active resistance is positioned downstream, preferably with an electrode on the reference potential of the analyzing control device, on the ground potential in particular.

In one particular embodiment of the invention, reaching of the threshold values, and/or triggering of the switch, and/or comparison with the reference data is/are monitored by a microcontroller. A few integrated circuits, or even a single integrated circuit, may be involved, one or more through which analog-to-digital conversion of the input signals and the electronic computer unit for comparison of the quotients and the sum of on-periods and off-periods, along with subsequent comparison with stored reference data, are carried out. The output signal of the microcontroller may be coded by analog means and/or, as specified, digitally coded, including output of a frequency-analogous signal. The microcontroller may, in addition, generate the necessary self-diagnosis signals and error signals in accordance with the standards in effect, and output the signals by way of preset interfaces.

In one particular embodiment of the present invention the holding current is lowered when the actuator is connected. This results both in conservation of energy and in reduction of mechanical and thermal stress, both on the device in question and on the overall equipment environment. The holding current may be lowered, for example, by lowering the rated coil current, by setting a preset pulse-width ratio or the like.

In one particular embodiment of the present invention, the circuit current is increased in relation to the rated current when the actuator is switched. Consequently, a faster switching process can be achieved when necessary. Increasing the circuit current may result, for example, from temporary short-circuiting of resistances connected in series with the coil winding, by connecting an overvoltage or the like.

This invention also relates to a switching system for application by circuitry of the process described and to a device, i.e., a hydraulic valve having such a switching system.

In one particular embodiment of the present invention, the computer unit is designed as an integrated circuit. Signal processing is carried out predominantly or exclusively by digital means. The miniaturization accompanying the design as integrated circuitry creates the possibility of designing the circuit system as a unit integrated with the device. In addition to corresponding immunity to interference and processing speed, the electronics can be mounted very near the actuator from the structural viewpoint.

As is to be seen from the foregoing description of the process, not only may the position x of the control element be determined, but so also may the temperature T of the actuator determined. The coil winding temperature in particular can be determined. Determination of the temperature without a separate temperature sensor is accordingly possible. In some applications, the temperature of the coil winding is more or less equal to the temperature of the medium in the device or the temperature of the fluid in the hydraulic valve, for example, or in any event to a convincing gauge of this value. In addition, the temperature as thus determined may be employed for development of protection of the coil winding of the electromagnet against excess temperature.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
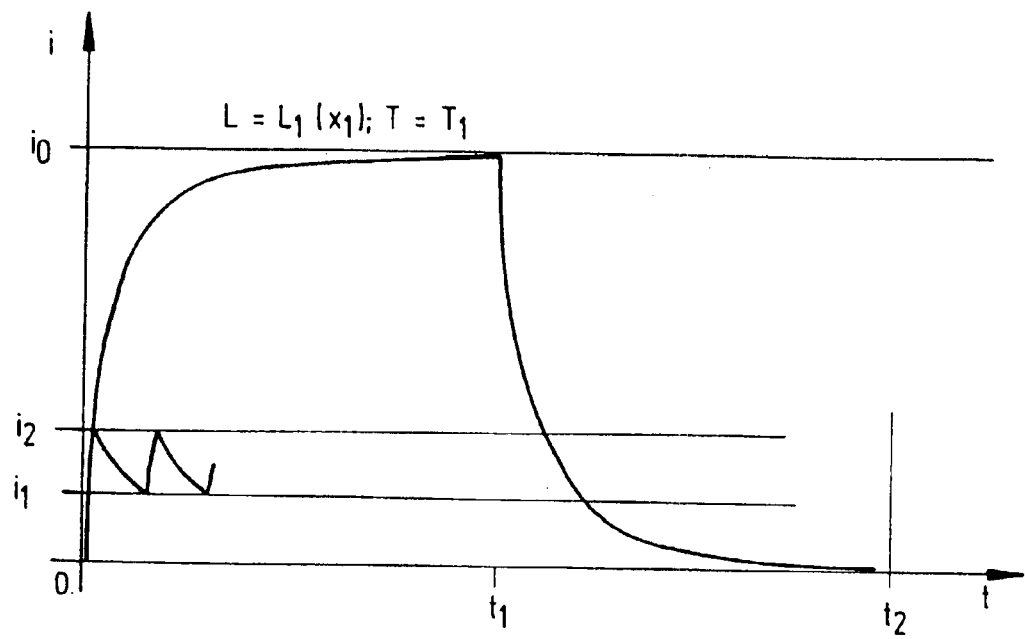
FIG. 1 is a graph illustrating the variation i(t) in the coil current i of an electromagnet over time t when the armature is in a first position $x_1$.
Figure 5:
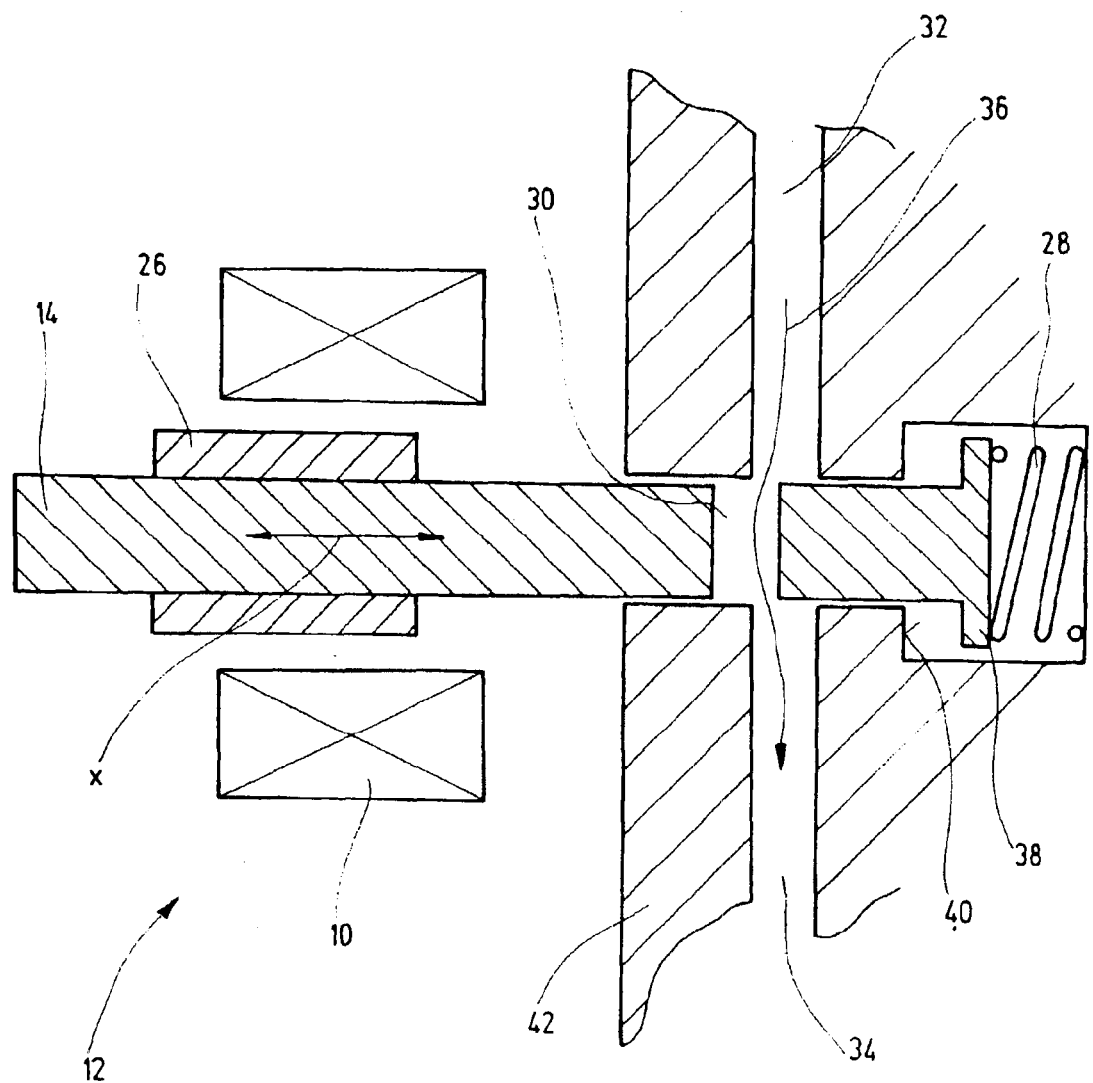
FIG. 5 a side elevational view in cross-section of a device according to the present invention.

FIG. 1 illustrates the variation in the coil current i over or as a function of time t of the coil winding 10 of an electromagnet of a device 12 of the present invention (FIG. 5). During the connection process $0<t<t_1$ a rated voltage $U_0$ is applied to the electromagnet. From the rated voltage and the active resistance R of the coil winding, the final value of the current $i_0$, with $i_0=U_0/R$, is obtained. During the disconnection process $t_1<t<t_2$ the rated voltage $U_0$ is removed from the connections of the coil winding 10 and an exponentially decreasing current i(t) results. The relevant time constant t is determined by the quotient of the coil inductance L and the active resistance R of the coil winding. The temperature T of the system for the variation in i(t) illustrated in FIG. 1 is designated as a first value $T_1$.

The inductance L of an electromagnet, which as shown in the exemplary embodiment in FIG. 5 of the device 12 of the present invention as an hydraulic proportional valve 42 and which has an axially movable armature 14, depends on the position x of the armature 14 relative to the coil winding 10. For the first armature position $x_1$, a coil inductance $L_1$ is taken as the point of departure in the case of the current variation i(t) in FIG. 1.

Figure 4:
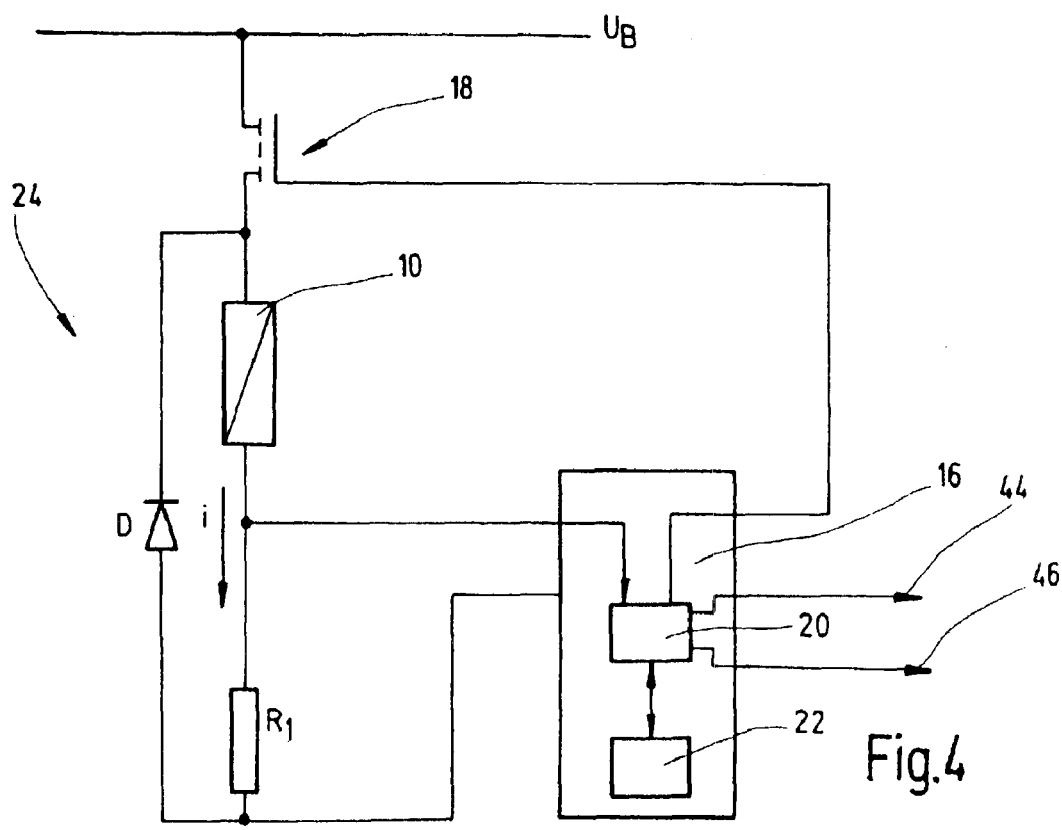
FIG. 4 is a block diagram of a circuit system according to the present invention.

With the circuit system shown in FIG. 4, an electric operating point of the coil winding 10 may be set by evaluating the voltage drop caused by the coil current on the precision resistor $R_1$. When a lower threshold value $i_1$ is reached, the switch 18 is connected by the control device 16. When the upper threshold value $i_2$ is reached, the switch 18 is disconnected. As a result, the variation in coil current i(t) shown in FIG. 1 takes place. The on-period $t_{on}$ and the off-period $t_{off}$ depend on selection of the lower threshold value $i_1$, the upper threshold value $i_2$, and the inductance L of the coil winding, and thus, depend on the position x of the armature 14 and of the active resistance R of the coil winding, which resistance in turn depends on the temperature of the coil winding 10.

Figure 2:
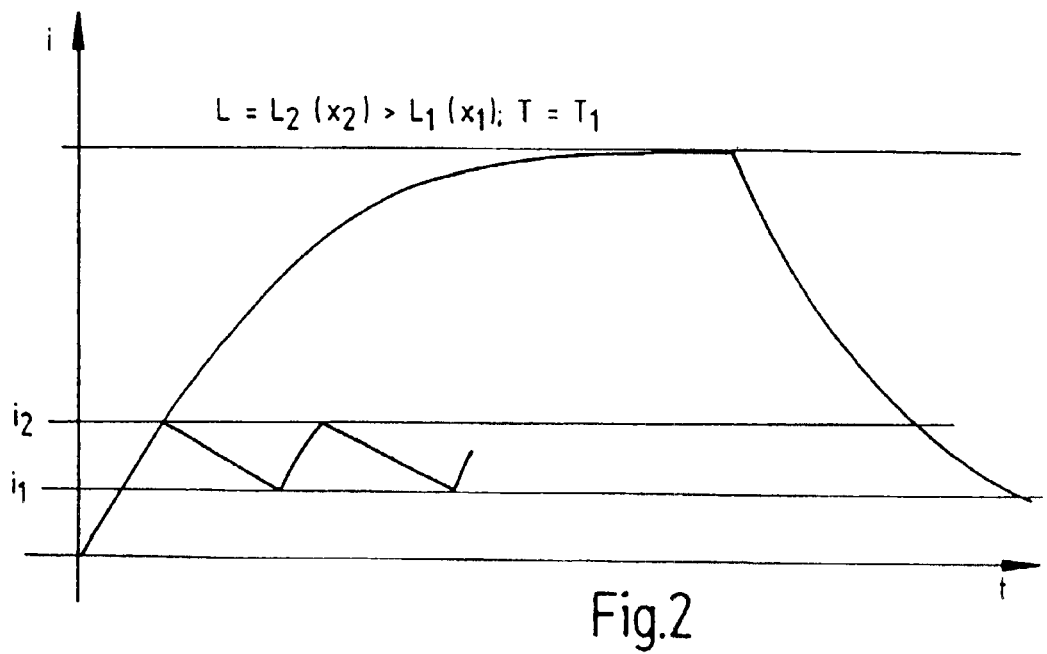
FIG. 2 is a graph illustrating the variation i(t) when the armature is in a second position $x_2$.

Variation i(t) in the same coil winding 10 is illustrated in FIG. 2 for a second position $x_2$ of the armature 14, but with the temperature $T_1$ unchanged. In this position, $x_2$, the armature 14 has entered farther into the coil winding 10, so that the inductance $L-L_2(x_2)$ is greater than the inductance $L_1(x_1)$, which results when the armature 14 is in a position $x=x_1$.

The current variation i(t) illustrated in FIG. 2 by the accompanying quotient of $t_{on}$ or $t_{off}$ and the sum of $t_{on}+t_{off}$ (see FIG. 3) may also be obtained in the event of unvarying position $x=x_1$ of the armature 14, but with a correspondingly elevated temperature $T_2>T_1$. Consequently, it still cannot be determined unambiguously from the modified current variation i(t) if such variation has resulted from a change in position x of the armature 14 and/or a change in temperature T.

Figure 3:
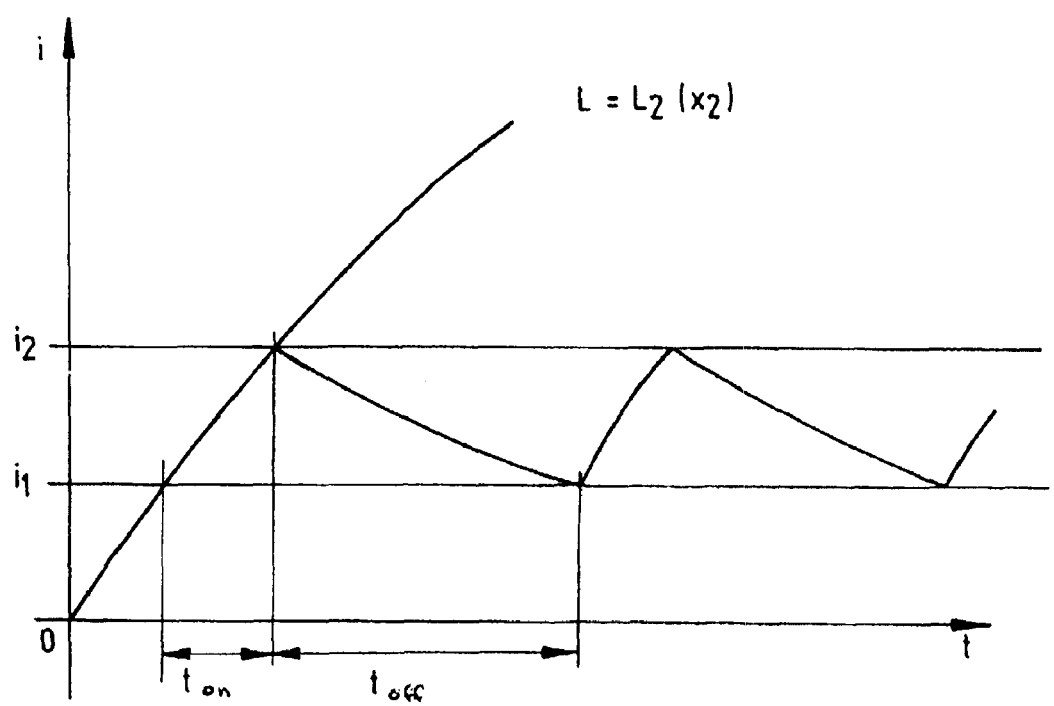
FIG. 3 is an enlarged graph of the current variation i(t) as shown in FIG. 2 in the area of the lower and upper threshold values $i_1$ and $i_2$ respectively.

FIG. 3 presents an enlarged diagram of the current variation i(t) of FIG. 2 in the area of the lower or upper threshold value $i_1$ or $i_2$. An on-period $t_{on}$ and an off-period $t_{off}$ are obtained at the operating point shown. These values are acquired by an electronic computer unit 20 of the control device 16 (FIG. 4) and are evaluated so that first the quotient of on-period $t_{on}$ and the sum $t_{on}+t_{off}$ of on-period $t_{on}$ and off-period $t_{off}$ is formed. This quotient is compared with the reference data on file in electronic storage means 22 in the control device 16. The stored reference data are determined empirically with one or more exemplars typical of the design of the relevant device 12. The reference data may be permanently stored or may vary by being programmed. For example, a read-only memory (ROM) or a programmable read-only memory (PROM, EPROM, EEPROM) may be built into or removably inserted into the storage device 16.

In addition, the sum ($t_{on}+t_{off}$) is formed by the control device 16 and compared with appropriate reference data also stored in the electronic storage means 22. Both the position x of the armature 14 of the device 12 and the temperature T of the coil winding 10 may be determined from this comparison, which preferably is program-controlled and is accompanied by automatic processing of a corresponding control program.

In the exemplary embodiment shown in FIG. 4 illustrating the circuitry 24 of the present invention, the switch 18 is in the form of a MOS transistor. Such transistor can, with negligibly small driving power, switch high loads with low forward resistance. A freewheeling diode D is connected in parallel with the serial connection of coil winding 10 and precision resistor $R_1$. After a stationary state has been reached, connected through for example, the control device 16 can lower the holding current, as for example by means of a preset pulse width ratio. For the purpose of a rapid switching process, the control device 16 may increase the circuit current for a brief period, for example, by short-circuiting the precision resistor $R_1$ or by means of a brief overvoltage. The control device 16, which preferably uses or is in the form of a microcontroller, may also emit, in addition to the signal 44 for position x of the armature 14, a self-diagnosis and/or trouble signal 46 optionally meeting existing standards.

FIG. 5 presents a diagram of a cross-section through a device 12 of the present invention. This exemplary embodiment represents an electromagnetically drivable hydraulic proportional valve 42. The paramagnetic or diamagnetic armature 14 has, in the area of the coil winding 10, a casing 26 in the form of a sleeve. Casing 26 is preferably ferrimagnetic or ferromagnetic. When current is applied to the coil winding 10, the armature 14 is subjected to a force opposing the action of the energy accumulator 28 mounted in the valve 42. The energy accumulator may be in the form of a helical pressure spring.

The armature 14 has a boring 30 corresponding to the inlet and outlet channels 32 and 34 of the valve 42. In this exemplary embodiment, boring 32 extends in the same direction as the channels. The position x of the armature 14 determines the effective cross-section of the boring 30, and accordingly, the flow 36 of a fluid through the valve 42. When the coil winding is in the voltage-free state, the armature 14 assumes an end position closing off the valve 42 by application of the flange 38, formed on the end side and preferably ring-shaped, to a bearing surface 40, also preferably ring-shaped.

While one embodiment has been chosen to illustrate the invention, it will be understood by those skilled in the art that various changes and modifications can be made therein without departing from the scope of the invention as defined in the appended claims.

What is claimed is:

1. A process for determining positions of a control element of an electrically driven actuator, comprising the steps of:

switching on the actuator by a controlled switch when a lower threshold value is reached;

switching off the actuator by the controlled switch when an upper threshold value is reached;

determining an on-period and an off-period as a function of the lower threshold, the upper threshold and electric switching behavior of the actuator depending on positioning of the control element; and determining positions of the control element from a comparison of a quotient of the on-period or off-period and a sum of the on-period and off-period and from a comparison of the sum of the on-period and off-period with corresponding stored reference data.

2. A process according to claim 1 wherein the control element of the actuator is an armature of an electromagnet.

3. A process according to claim 1 wherein the control element movement actuates a valve.

4. A process according to claim 1 wherein the lower and upper threshold values are preset.

5. A process according to claim 1 wherein the upper and lower threshold values are selectable.

6. A process according to claim 1 wherein the upper and lower threshold values are controlled by a stored program.

7. A process according to claim 4 where monitoring of reaching of the threshold values, triggering of the switch and comparison with the stored reference data are performed by a microcontroller.

8. A process according to claim 1 wherein a voltage signal on a resistor connected in series with the actuator is evaluated for monitoring reaching of the threshold values.

9. A process according to claim 1 wherein a holding current is lowered when the actuator is switched through.

10. A process according to claim 1 wherein circuit current is increased in relation to a rated current when the actuator is switched.

11. A circuit system for determining positions of a control element of an electrically driven actuator, comprising:

a controlled switch for switching on the actuator upon reaching a lower threshold value and for switching off the actuator upon reaching an upper threshold value;

period means for obtaining an on-period and an off-period as a function of the lower threshold value, the upper threshold value and electric switching behavior of the actuator depending on positioning of the control element; and measurement engineering acquiring means for acquiring the on-period and the off-period, said acquiring means including an electronic computer unit for determining positions of the control element from a comparison of a quotient of the on-period or off-period and a sum of the on-period and off-period and from a comparison of the sum of the on-period and off-period with corresponding stored reference data.

12. A hydraulic valve, comprising:

an inlet;

an outlet;

a movable valve member regulating fluid flow through said inlet and said outlet;

a control element of an electrically driven actuator coupled to said movable valve member;

a controlled switch for switching on the actuator upon reaching a lower threshold value and for switching off the actuator upon reaching an upper threshold value;

period means for obtaining an on-period and an off-period as a function of the lower threshold value, the upper threshold value and electric switching behavior of the actuator depending on positioning of the control element; and measurement engineering acquiring means for acquiring the on-period and the off-period, said acquiring means including an electronic computer unit for determining positions of the control element from a comparison of a quotient of the on-period or off-period and a sum of the on-period and off-period and from a comparison of the sum of the on-period and off-period with corresponding stored reference data, said computer unit being an integrated circuit combined with said valve to form a structural unit.

13. A device, comprising:

an electrically driven actuator having a control element;

a controlled switch for switching on the actuator upon reaching a lower threshold value and for switching off the actuator upon reaching an upper threshold value;

period means for obtaining an on-period and an off-period as a function of the lower threshold value, the upper threshold value and electric switching behavior of the actuator depending on positioning of the control element; and measurement engineering acquiring means for acquiring the on-period and the off-period, said acquiring means including an electronic computer unit for determining positions of the control element from a comparison of a quotient of the on-period or off-period and a sum of the on-period and off-period and from a comparison of the sum of the on-period and off-period with corresponding stored reference data, said computer unit being an integrated circuit combined with the device to form a structural unit.

* * * * *